(12) United States Patent
Zhang

(10) Patent No.: US 12,461,194 B2
(45) Date of Patent: Nov. 4, 2025

(54) METHOD FOR IMPROVING TARGET DETECTION ACCURACY, AND INTEGRATED CIRCUIT, AND RADIO DEVICE

(71) Applicant: CALTERAH SEMICONDUCTOR TECHNOLOGY (SHANGHAI) CO., LTD., Shanghai (CN)

(72) Inventor: Xiaolong Zhang, Shanghai (CN)

(73) Assignee: Calterah Semiconductor Technology (Shanghai) Co., Ltd., Shanghai (CN)

( * ) Notice: Subject to any disclaimer, the term of this patent is extended or adjusted under 35 U.S.C. 154(b) by 545 days.

(21) Appl. No.: 17/998,802

(22) PCT Filed: Mar. 1, 2021

(86) PCT No.: PCT/CN2021/078409
§ 371 (c)(1),
(2) Date: Nov. 14, 2022

(87) PCT Pub. No.: WO2021/170133
PCT Pub. Date: Sep. 2, 2021

(65) Prior Publication Data
US 2023/0258766 A1 Aug. 17, 2023

(30) Foreign Application Priority Data
Feb. 28, 2020 (CN) .......................... 202010131027.X

(51) Int. Cl.
*G01S 13/58* (2006.01)
*G01S 7/28* (2006.01)
(Continued)

(52) U.S. Cl.
CPC .............. *G01S 7/354* (2013.01); *G01S 7/356* (2021.05); *G01S 7/411* (2013.01); *G01S 13/584* (2013.01)

(58) Field of Classification Search
CPC .......... G01S 7/354; G01S 7/356; G01S 7/411; G01S 13/584
See application file for complete search history.

(56) References Cited

U.S. PATENT DOCUMENTS

| 3,935,572 A | 1/1976 | Broniwitz et al. |
| 5,977,905 A | 11/1999 | Le Chevalier |
(Continued)

FOREIGN PATENT DOCUMENTS

| CN | 101980046 A | 2/2011 |
| CN | 105549002 A | 5/2016 |
(Continued)

OTHER PUBLICATIONS

Cheng-fa Xu, et al., "Velocity Compensation Method Based on Search for Step Frequency Radar", Transactions of Beijing institute of Technology, Apr. 15, 2008, 4 pgs.
(Continued)

*Primary Examiner* — Vladimir Magloire
*Assistant Examiner* — Kimberly Jenkins
(74) *Attorney, Agent, or Firm* — USCH Law, PC

(57) ABSTRACT

Embodiments of the present disclosure provide a method for improving object detection accuracy, a computer device, a storage medium, an integrated circuit, a radio device, and an electronic device, and relate to the technical field of radar signal processing. The method for improving object detection accuracy includes: obtaining a velocity ambiguity factor and object peak data based on an echo signal (step 301), compensating the object peak data based on the velocity ambiguity factor (step 302), and obtaining the object data based on the compensated peak data, where the object data is adopted as real object data (step 303). Compared with the object data obtain in a conventional way, the real object data obtained by the method for improving object detection
(Continued)

accuracy is more accurate, and this is especially true when the object velocity is excessive high.

14 Claims, 5 Drawing Sheets

(51) Int. Cl.
  *G01S 7/35* (2006.01)
  *G01S 7/41* (2006.01)

(56) References Cited

U.S. PATENT DOCUMENTS

| | | | | |
|---|---|---|---|---|
| 6,078,281 | A * | 6/2000 | Milkovich | G06F 17/14 342/162 |
| 9,608,334 | B2 * | 3/2017 | Spella | H01L 23/66 |
| 9,835,723 | B2 * | 12/2017 | Jansen | G01S 13/343 |
| 2010/0262009 | A1 * | 10/2010 | Lynch | G01S 7/52036 600/455 |
| 2011/0095939 | A1 * | 4/2011 | Martin | G01S 13/582 342/109 |
| 2012/0094594 | A1 * | 4/2012 | Rofougaran | G06F 3/017 455/556.1 |
| 2013/0147666 | A1 * | 6/2013 | Abe | G01S 13/345 342/451 |
| 2016/0131752 | A1 | 5/2016 | Jansen et al. | |
| 2020/0116850 | A1 * | 4/2020 | Santra | A61B 5/0507 |
| 2022/0221570 | A1 * | 7/2022 | Zhu | G01S 7/2883 |
| 2022/0342036 | A1 * | 10/2022 | Rao | G01S 13/92 |
| 2023/0184883 | A1 * | 6/2023 | Li | G01S 7/003 342/59 |

FOREIGN PATENT DOCUMENTS

| | | | |
|---|---|---|---|
| CN | 106405556 | A | 2/2017 |
| CN | 106443671 | A | 2/2017 |
| CN | 106950550 | A | 7/2017 |
| CN | 106970371 | A | 7/2017 |
| CN | 107144834 | A | 9/2017 |
| CN | 107966688 | A | 4/2018 |
| CN | 108490426 | A | 9/2018 |
| CN | 108680918 | A | 10/2018 |
| CN | 108761404 | A | 11/2018 |
| CN | 109257113 | A | 1/2019 |
| CN | 109444819 | A | 3/2019 |
| CN | 109521410 | A | 3/2019 |
| CN | 110398730 | A | 11/2019 |
| CN | 110412558 | A | 11/2019 |
| CN | 110426679 | A | 11/2019 |
| CN | 110488270 | A | 11/2019 |
| CN | 110646774 | A | 1/2020 |
| EP | 0818691 | A1 | 1/1998 |
| JP | H10319059 | A | 12/1998 |
| JP | 2010281605 | A | 12/2010 |
| JP | 2018059953 | A | 4/2018 |
| JP | 2019200145 | A | 11/2019 |
| WO | 2011021262 | A1 | 2/2011 |

OTHER PUBLICATIONS

Gang Zheng, et al., "SFCW Sampling Frequency Follows Method", Modern Navigation, Jun. 25, 2012, 6 pgs.

Ke Ma, et al., "Motion Compensation Method for High-Speed Target Detection of Ultra-Short-Range Radar", Electronic Sci. & Tech., Jan. 15, 2013, 3 pgs.

Yuefeng Li, et al., "A Three-dimensional HT-TBD Algorithm Based on Dynamic Bias Compensation under Ambiguity of Range and Velocity", 2017 17th IEEE International Conference on Communication Technology, Jul. 6, 2018, 6 pgs.

Calterah Semiconductor Technology (shanghai) Co.,Ltd., CN First office action with English translation, CN 2021102239731, Dec. 15, 2023, 14 pgs.

Calterah Semiconductor Technology (shanghai) Co., Ltd., CN Notification to Grant Patent Right for Invention with English translation, CN 2021102239731, Feb. 6, 2024, 6 pgs.

Jiancheng Zhang, et al., High-speed Maneuvering Target Detection Based on Non-searching Estimation of Motion Parameters, Journal of Electronics & Information Technology, vol. 38 No. 6, Mar. 29, 2016, 8 pgs.

Zhiling Lian, et al., Velocity Ambiguity Resolution Based on Look-up Table Method, Radar Science and Technology, vol. 9 No. 4, Aug. 15, 2011, 5 pgs.

Calterah Semiconductor Technology (shanghai) Co., Ltd., International Search Report with English translation, PCT/CN2021/078409, Jun. 7, 2021, 8 pgs.

\* cited by examiner

METHOD FOR IMPROVING TARGET DETECTION ACCURACY, AND INTEGRATED CIRCUIT, AND RADIO DEVICE

CROSS REFERENCE TO RELATED APPLICATIONS

The present application is a United States National Stage Application filed under 35 U.S.C. § 371 of PCT Patent Application Serial No. PCT/CN2021/078409, filed Mar. 1, 2021, which claims priority to Chinese Patent Application No. CN202010131027.X, entitled "RADAR RANGING AND SPEED MEASURING METHOD, DEVICE, RADAR SYSTEM AND STORAGE MEDIUM," filed on MONTH DAY, YEAR, each of which is incorporated by reference herein in its entirety.

TECHNICAL FIELD

The present disclosure relates to the technical field of radar signal processing, and in particular, to a method for improving object detection accuracy, a computer device, a storage medium, an integrated circuit, a radio device, and an electronic device.

BACKGROUND

At present, a frequency modulation continuous wave (FMCW) sensor is likely to experience ambiguity issues (e.g., velocity ambiguity and/or range ambiguity) when performing two-dimension fast Fourier transform (FFT) to detect an object with great velocity, which results in poor accuracy.

SUMMARY

In order to improve the poor accuracy in object detection, the present disclosure provides a method for improving object detection accuracy, a computing device, a storage medium, an integrated circuit, a radio device, and an electronic device.

In an embodiment, a method for improving object detection accuracy, including: obtaining a velocity ambiguity factor and object peak data based on an echo signal; compensating the object peak data based on the velocity ambiguity factor; and obtaining object data based on the compensated object peak data.

In this embodiment, compensating the object peak data based on the velocity ambiguity factor to obtain the real information of the object is a more accurate way compared with the conventional art. And this is especially true when the object velocity is high.

In an embodiment, the method includes: presetting a velocity threshold; obtaining an object velocity; and determining whether the object velocity is greater than the preset velocity threshold. In response to the object velocity being greater than the preset velocity threshold, compensating the object peak data based on the velocity ambiguity factor and obtaining the object data based on the compensated object peak data.

In this embodiment, whether the object velocity exceeds the preset velocity threshold or not is determined in advance, and after that, whether to perform subsequent compensation or not is determined. Thus, different detection methods are applied to varying application scenarios for a desirable match, so that object detection methods can be adapted to requirements of varying application scenarios. For scenarios with high-velocity objects, compensation is performed based on the velocity ambiguity factor to effectively reduce the adverse effects brought by the high velocity on detection, to improve detection accuracy. For scenarios with low-velocity objects, compensation is not desired and object detection can be performed in a conventional way.

In an embodiment, the object data includes at least one of range, velocity, angle, and shape.

It should be noted that compensation is performed to velocity and/or range of the object before obtaining the angle and point cloud data (e.g., shape and posture obtained based on point cloud data).

In an embodiment, obtaining the velocity ambiguity factor and the object peak data based on the echo signal includes: performing analog-to-digital conversion (ADC), sampling, range fast Fourier transform (1D FFT), doppler fast Fourier transform (2D FFT), and constant false alarm rate (CFAR) detection, to obtain the velocity ambiguity factor and the object peak data.

It should be noted that for the FMCW sensor, the compensation is performed between CFAR and direction of arrive (DoA) in conventional signal processing.

In an embodiment, compensating the object peak data based on the velocity ambiguity factor includes: obtaining a compensation coefficient based on a sampling interval of an input data of a 2D FFT; obtaining a compensation value based on the compensation coefficient and the velocity ambiguity factor; and compensating the object peak data based on the compensation value.

In an embodiment, obtaining the compensation value based on the compensation coefficient and the velocity ambiguity factor includes: obtaining the compensation value based on the compensation coefficient, the velocity ambiguity factor, a remainder of a doppler frequency shift and the sampling interval of the input data of the 2D FFT.

In an embodiment, obtaining the compensation coefficient based on the sampling interval of the input data of the 2D FFT includes: obtaining the compensation coefficient based on a sweeping bandwidth, a window size of a window function, FFT point quantity, a sweeping central frequency, a sampling rate, and the sampling interval of the input data of the 2D FFT.

In an embodiment, in obtaining an object range based on the compensated object peak data, the compensated object peak data includes a range factor, a compensation value includes a range compensation value, the compensation coefficient includes a range compensation coefficient, the window size of the window function includes a doppler window size, the FFT point quantity includes point quantity of a window function in the 1D FFT, and obtaining the compensation coefficient based on the sweeping bandwidth, the window size of the window function, the FFT point quantity, the sweeping central frequency, the sampling rate, the sampling interval of the input data of the 2D FFT include: obtaining the range compensation coefficient based on the sweeping bandwidth, the window size of the window function, the FFT point quantity, the sweeping central frequency, the sampling rate, the sampling interval of the input data of the 2D FFT. The range compensation value is obtained based on the range compensation coefficient and the velocity ambiguity factor, and the range factor of the object peak data is compensated based on the range compensation value, to obtain the object range.

In an embodiment, in obtaining an object velocity based on the compensated object peak data, the compensated object peak data includes a velocity factor, a compensation value includes a velocity compensation value, the compensation coefficient includes a velocity compensation coefficient, the window size of the window function includes a range window size, the FFT point quantity includes point quantity of a window function in the 2D FFT, and obtaining the compensation coefficient based on the sweeping bandwidth, the window size of the window function, the FFT point quantity, the sweeping central frequency, the sampling rate, the sampling interval of the input data of the 2D FFT include: obtaining the velocity compensation coefficient based on the sweeping bandwidth, the window size of the window function, the FFT point quantity, the sweeping central frequency, the sampling rate, the sampling interval of the input data of the 2D FFT. The velocity compensation value is obtained based on the velocity compensation coefficient and the velocity ambiguity factor, and the velocity factor of the object peak data is compensated based on the velocity compensation value, to obtain the object velocity.

The present disclosure provides a computer device, including a memory and a processor, where the memory stores one or more programs that, when executed by the processor, cause the processor to implement the method according to any one above.

The present disclosure provides a computer-readable medium, where the computer-readable storage medium stores one or more programs that, when executed by a processor, cause the processor to implement the method according to any one above.

The present disclosure provides an integrated circuit, a signal transmitting and receiving channel, configured to transmit radio signals and receive echo signals reflected by an object; a signal processing module, configured to obtain object data based on the method according to any one above.

In an embodiment, the signal processing module includes: a signal processing unit, configured to obtain a velocity ambiguity factor and object peak data based on the echo signals; a compensation unit, configured to compensate the object peak data based on the velocity ambiguity factor; and a data processing unit, configured to obtain object data based on the compensated object peak data.

In an embodiment, the radio signals are millimeter wave signals.

In an embodiment, the integrated circuit is an antenna-in-package (AiP) chip or an antenna-on-chip (AoC) chip.

The present disclosure provides a radio device, including: a carrier; an integrated circuit, where the integrated circuit is the integrated circuit according to any one above, and is mounted on the carrier; and an antenna, where the antenna is mounted on the carrier or form an AiP or an AoC structure together with the integrated circuit, and is configured to transmit and receive radio signals.

The present disclosure also provides an electronic device, including: a device main body; and a radio device, where the radio device is the radio device according to embodiments of the present disclosure, and is mounted on the device main body; the radio device is configured to perform object detection and/or communication.

DETAILED DESCRIPTION

In order to make the purpose, the technical solution, and the advantages of the present disclosure clearer, the present disclosure will be described in detail through specific embodiments with reference to the accompanying drawings.

The method for improving object detection accuracy provided according to the embodiments is applicable to all kinds of sensing systems. In the following, the technical content will be described in details with a FMCW radar as an example. It should be noted that the present disclosure is not limited to radar applications but also applicable to all sensors capable of object detection.

At present, the FMCW radar can detect both range and velocity. Its advantage in short distance measurement is increasingly recognized and therefore it has been extensively used for vehicle obstacle avoidance.

The basic operating principle of the FMCW radar to detect velocity and range: transmitting radio signals by a transmitting antenna to a target area to detect objects, echo signals are formed by the objects reflecting the radio signals, and receiving the echo signals by a receiving antenna; mixing, by a signal processing module, the echo signals to obtain intermediate frequency signals and performing ADC, sampling, 1D FFT, 2D FFT, CFAR and DoA to obtain the range, velocity and angle of the objects, performing applications like point cloud imaging, vital signals detection and monitoring by using the obtained object information (i.e., object data).

Figure 1:
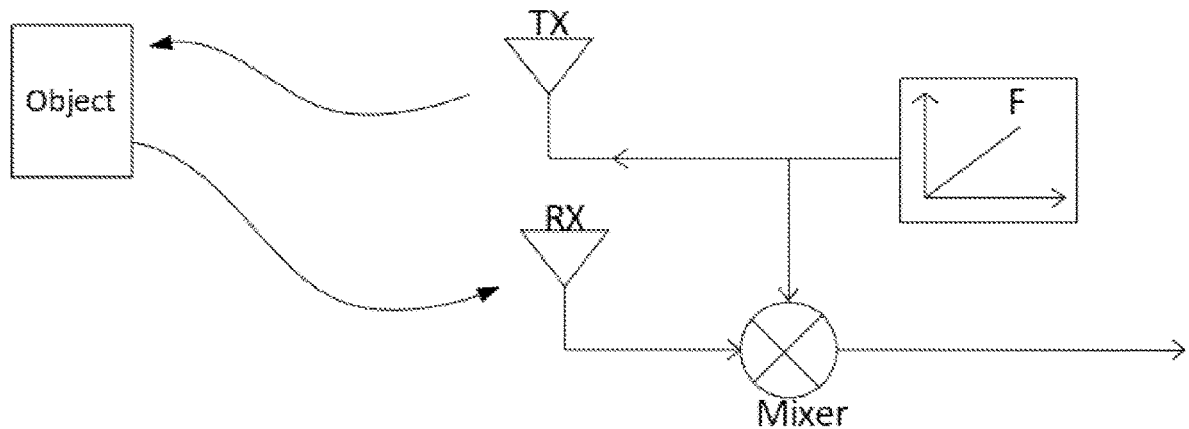
FIG. 1 is a schematic view of a radar system provided according to an embodiment of the present disclosure.

As shown in FIG. 1, the FMCW radar includes a signal generator F configured to generate electromagnetic signals. A transmitting end of a radar system includes a transmitting antenna Tx, a receiving end of the radar system includes a receiving antenna Rx. The transmitting antenna Tx is configured to transmit transmitting signals in an electromagnetic wave form, during transmission of the electromagnetic wave signals that will be reflected by an object in response to meeting the object, the reflected electromagnetic wave signals are referred to as echo signals. The receiving antenna Rx is configured to receive the echo signals. The radar system further includes a mixer where the echo signals are mixed with the transmitting signals to obtain mixed frequency signals. Based on the above basic operating principle of the FMCW radar, the parameters, such as velocity and range of the object can be detected.

The above method for detecting velocity and range, however, has poor accuracy in calculating object velocity and a range from the object to the radar.

In order to address the above technical problem, the present disclosure provides a method for improving object detection accuracy, a computer device, a storage medium, an integrated circuit, a radio device, and an electronic device. In the following, the environment for the method for improving object detection accuracy provided according to the embodiments of the present disclosure to be implemented is described.

Figure 2:
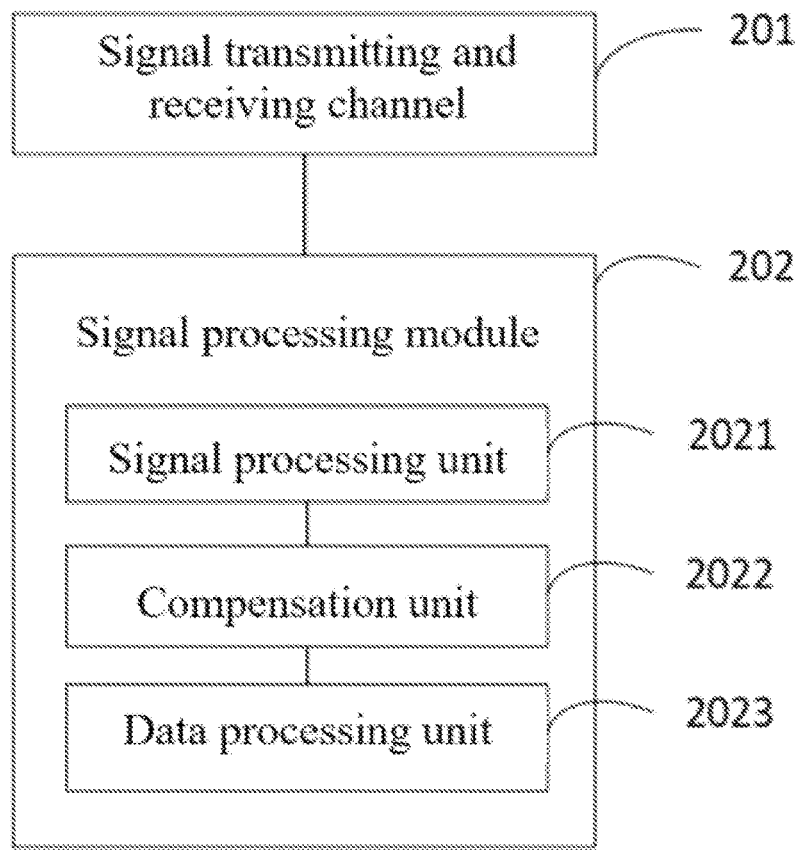
FIG. 2 is a schematic view of an integrated circuit provided according to an embodiment of the present disclosure.

The method for improving object detection accuracy provided according to the embodiments of the present disclosure is applicable to an integrated circuit as shown in FIG. 2. The integrated circuit includes a signal transmitting and receiving channel 201 and a signal processing module 202. The signal transmitting and receiving channel 201 is configured to transmit radio signals (e.g., millimeter wave signals, terahertz signals), and receive echo signals reflected by the object, and the signal processing module 202 is configured to process the echo signals using the method as described in any one embodiment of the present disclosure to obtain the object data.

In an embodiment, the signal processing module 202 includes a signal processing unit 2021, a compensation unit 2022 and a data processing unit 2023. The signal processing unit 2021 is configured to obtain a velocity ambiguity factor and object peak data of based on the echo signals, the compensation unit 2022 is configured to compensate the object peak data based on the velocity ambiguity factor, and the data processing unit 2023 is configured to obtain the object data based on the compensated object peak data.

In an embodiment, the integrated circuit has a structure without antennas or a structure with antennas (e.g., AiP or AoC). The above radio signals are millimeter wave signals.

The integrated circuit is connected to a digital module of an on-chip system by a unified digital controller, and is configured to uniformly manage and configure operation state of the digital module by a configuration module and a state machine, which improves operation control efficiency for the on-chip system of the integrated circuit.

In an embodiment, the integrated circuit includes multiple digital circuits, multiple function-specific digital modules, and an operation control device. The multiple digital circuit are basic component of the integrated circuit, and the multiple digital circuits enable different functions. The multiple function-specific digital modules are configured to detect whether the multiple digital circuits have proper functioning, and the operation control device is configured to uniformly configure and manage the multiple function-specific digital modules. A digital controller in the operation control device is configured to transmit control signals for function detection through digital interfaces to the function-specific digital modules. The configuration information that can be externally accessed and state information are stored in the configuration module. The state machine is configured to control the workflow of the integrated circuit, which can read the configuration information stored in the configuration module and transmit control signals generated by the digital controller to function-specific digital modules to detect the various digital circuits.

In an embodiment, the method for improving object detection accuracy provided according to the present disclosure is applicable to a radio device. The radio device includes: a carrier; an integrated circuit, where the integrated circuit is the integrated circuit according to any one above, and is mounted on the carrier; and an antenna, where the antenna is mounted on the carrier or form an AiP or an AoC structure together with the integrated circuit, and is configured to transmit and receive radio signals. The carrier may be embodied as a printed circuit board (PCB).

In an embodiment, the present disclosure provides a device, including a device main body; and a radio device, where the radio device is the radio device according to embodiments of the present disclosure, and is mounted on the device main body; the radio device is configured to perform object detection and/or communication. Specifically, in an embodiment of the present disclosure, the radio device may be set on the outside of the device main body, while in another embodiment of the present disclosure, the radio device may be set in the device main body. In some other embodiments of the present disclosure, the radio device may be also set partly in and partly outside the device, which is not limited thereto and may be determined as appropriate. It should be noted that the radio device is configured to implement object detection and communication by transmitting and receiving signals.

In an embodiment, the device main body may be embodied as a smart transport device (e.g., a car, a bicycle, a motorcycle, a ship, a subway and a train), a security and surveillance device (e.g., a camera), a smart wearable device (e.g., a band, a pair of glasses), a smart home device (e.g., a TV, an air conditioner, and a light), a communication device (e.g., a cell phone, a pad), a barrier gate, a smart traffic light, a smart billboard, a traffic camera, and an automated factory manipulators (or a robot). The device main body may also be embodied as various instruments monitoring vital signs and various devices on which such instruments are mounted. The radio device may be embodied as any radio device mentioned above in the embodiments of the present disclosure. The structure and basic operating principle of the radio device have been described in detail and will not be repeated.

In order to make the object, the technical solutions and the advantageous apparent, the technical solutions the present disclosure will be described more clearly and completely with reference to the accompanying drawings. Obviously, the described embodiments represent part of the embodiments of the present disclosure, not all of them.

Figure 3:
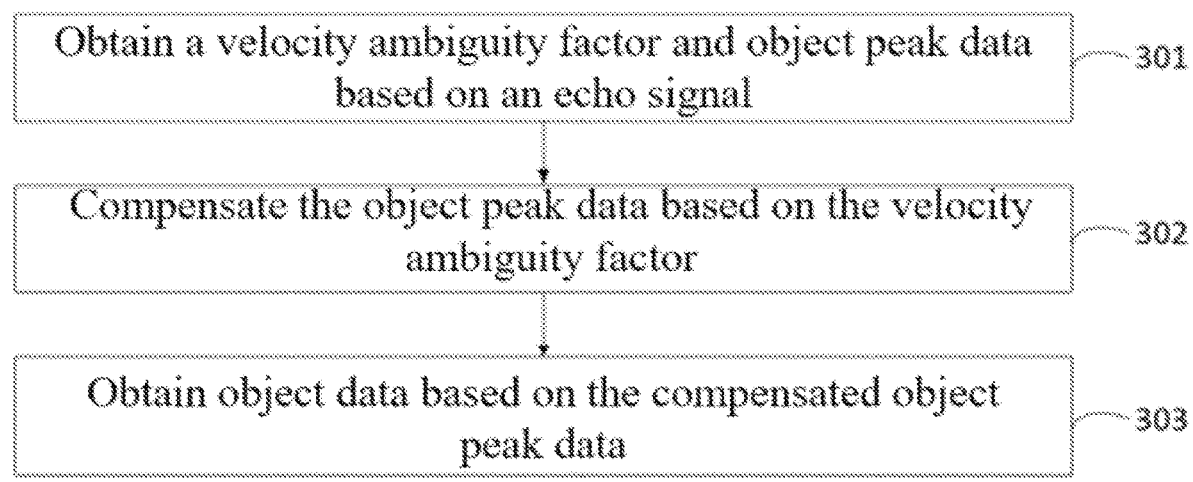
FIG. 3 is a flowchart of a method for improving object detection accuracy provided according to an embodiment of the present disclosure.

FIG. 3 is a flowchart of the method for improving object detection accuracy provided according to an embodiment of the present disclosure. The method for improving object detection accuracy can be applied in the radar system shown in FIG. 1. As shown in FIG. 3, the method for improving object detection accuracy includes the following steps.

In step 301, a velocity ambiguity factor and object peak data are obtained based on an echo signal.

The electromagnetic waves transmitted from FMCW radar are high frequency modulated continuous waves whose frequency changes in a certain pattern with time. The electromagnetic waves are generally zigzag waves, or triangle waves. The present disclosure takes the zigzag waves as an example. The electromagnetic wave within each modulation period T is referred to as a chirp whose frequency shows a tendency of linear increase with time.

Figure 4:
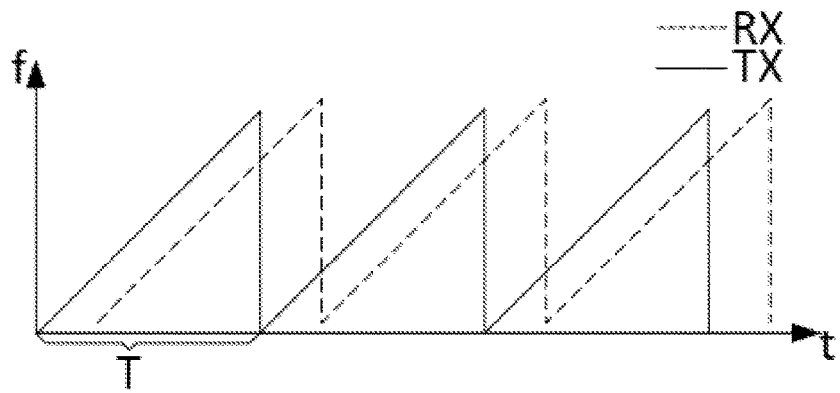
FIG. 4 is a schematic waveform of a chirp signal provided according to an embodiment of the present disclosure.

The echo signals received by the FMCW radar are electromagnetic waves reflected by the object. FIG. 4 shows the waveforms of the Tx signal and Rx signal. The mixing of the Tx signal and Rx signal is performed by mixing the Tx signal and Rx signal to obtain difference frequency signal, IF signal, which is the mixed signal, and may referred to as the intermediate frequency signal.

By digitally sampling the IF signal, sampling data can be obtained. The sampling data of each chirp are stored as a row in a matrix. For example, in response to there being M chirps, the matrix has M rows. In response to sampling point quantity of each chirp being N, the matrix has N columns, so that a sampling matrix of M rows and N columns is obtained.

Figure 5:
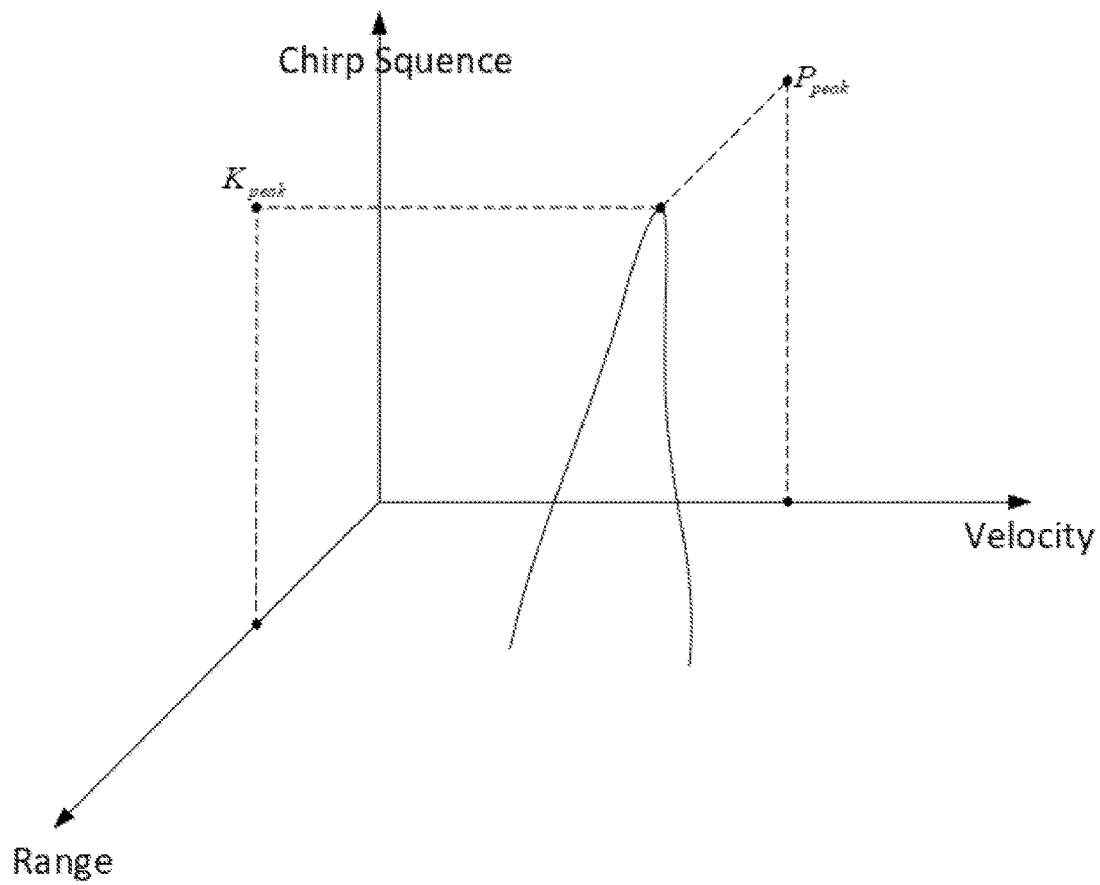
FIG. 5 is a schematic view of a CFAR result provided according to an embodiment of the present disclosure.

For a chirp in each modulation period (i.e., each row), 1D FFT is performed at N points, that is, 1D FFT, and 2D FFT is performed to M chirps across every chirp, so that the combination of 1D FFT (every row) and 2D FFT (every column) can be viewed as the 2D FFT of each frame of sampling data to obtain the object range and the object velocity. Therefore, the peak position of the 2D FFT corresponds to the range and velocity of the object in front of the radar. The CFAR detection is subsequently performed, and result is shown in FIG. 5, where the dashed lines help identify the values of a velocity factor $P_{peak}$ and a range factor $K_{peak}$.

In an embodiment, the following data can be obtained after the 2D FFT and the CFAR detection are done: sweeping bandwidth B, 1D FFT point quantity $n_{fft1}$, 2D FFT point quantity $n_{fft2}$ (i.e., 2D FFT size (LZ)), sampling interval T of an input data in 2D FFT, a sweeping central frequency $f_C$, sampling rate $F_S$, object range R, object vector velocity v, window size win1size of the window along range gate, window size win2size of the window along Doppler gate, remainder $f_{rd}$ of Doppler frequency shift $f_D$, chirp number n (i.e., pulse signal number), in-chirp time deviation $t_s$, mixed signal amplitude A and velocity ambiguity factor q, where the velocity ambiguity factor q can be used to denote the aliasing between true Doppler shift $f_D$ and pulse repetition frequency F.

It should be noted that in the expressions of the present disclosure, j is an imaginary unit, $\sqrt{-1}$; T is the sampling interval of the input data in 2D FFT in non-virtual antenna array; $T_D$ is the sampling interval of the input data in 2D FFT in virtual antenna array (T and $T_D$ in the expression provided according to the embodiments of the present disclosure are interchangeable based on whether the array is virtual). For example, for a virtual antenna array whose $T_X$ transmits a chirp each time, $T_D = T_X \cdot Ant_X \cdot Tr$, where Tr is the period of a single chirp and $T_X$ Ant is the number of transmitting antennas $T_X$. For a non-virtual array with a single transmitting antenna transmitting a chirp each time, T=Tr.

In addition, in the embodiments of the present disclosure, $f_{rd}$ needs to meet the following condition: $q \triangleq \text{round}(f_D/F)$, where $f_D = f_{rd} + q \times F$, $q \in Z$, $F = 1/T$, $-F/2 \le f_{rd} \le F/2$, Z is a natural number.

In the FMCW radar, the true Doppler shift $f_D$ calculated based on the transmitting signal and the echo signal is used to determine the vector velocity v of the object (reflector), $v = 0.5 \lambda \times f_D$, where $\lambda$ is the wave length of the transmitting signal. In response to $f_D$ being less than or equal to 0.5F, it is determined that the object velocity is within the velocity detection range of the radar. For example, in response to the velocity detection range of the radar being from −10 m/s to 10 m/s and the object velocity being 8 m/s, the detected object velocity will not have an issue of ambiguity.

In response to $f_D$ being more than 0.5F, that is, the object velocity is out of the velocity detection range of the radar. For example, in response to the velocity detection range of the radar being from −10 m/s to 10 m/s and the object velocity being 11 m/s, the detected object velocity will be calculated as −9 m/s as a result of Doppler velocity aliasing. In response to the object velocity being 31 m/s, or 51 m/s, the detected object velocity will still be −9 m/s due to Doppler velocity aliasing. The radar cannot tell the number of aliasing, also known as frequency interval, between the Doppler shift $f_D$ and the pulse repetition frequency F, thus experiencing ambiguity in the result.

In step 302, the object peak data is compensated based on the velocity ambiguity factor q.

In an embodiment, a compensation coefficient can be obtained based on the sampling interval of the input data in 2D FFT, a compensation value is obtained based on the compensation coefficient and the velocity ambiguity factor, and the object peak data is compensated based on the compensation value.

Specifically, the compensation value can be obtained based on the compensation coefficient, the velocity ambiguity factor, the remainder of Doppler shift, and the sampling interval of the input data in 2D FFT, as can be expressed in the following:

Peak-comp=comp×$(q + f_{rd} * T)$, where Peak-comp is the compensation value and comp is the compensation coefficient.

In an embodiment, the velocity factor $P_{peak}$ and the range factor $K_{peak}$ of the object peak data obtained after CFAR are generally compensated. Accordingly, the compensation value Peak-comp includes the velocity compensation value $P_{peak-comp}$ and the range compensation value $K_{peak-comp}$, and the compensation coefficient comp includes the range factor compensation coefficient rng-comp and the velocity factor compensation coefficient vel-comp. That is, the velocity factor P peak is compensated with the velocity compensation value $P_{peak-comp}$, and the range factor K peak is compensated with the range compensation value $K_{peak-comp}$.

In an embodiment, the range compensation value is calculated as following expression: $K_{peak-comp} \triangleq \text{rng\_comp} \cdot (q + f_{rd} \cdot T)$, and the velocity factor compensation value is calculated as following expression: $P_{peak-comp} \triangleq \text{vel\_comp} \cdot (q + f_{rd} \cdot T)$.

In an embodiment, the compensation coefficient is obtained based on the sweeping bandwidth, the window size of the window function, the FFT point quantity, the sweeping central frequency, the sampling rate, the sampling interval of the input data of the 2D FFT.

In an embodiment, in obtaining an object range based on the compensated object peak data, the range factor compensation coefficient is obtained based on the sweeping bandwidth, the window size of the window function, the FFT point quantity, the sweeping central frequency, the sampling rate, the sampling interval of the input data of the 2D FFT.

For example, the following expression can be used to obtain the range factor compensation coefficient:

rng_comp=$B \cdot \text{win2size}/2 \cdot n_{fft1} \cdot 1/T \cdot f_c \cdot F_s$.

In an embodiment, in obtaining the object velocity based on the compensated object peak data, the velocity factor compensation coefficient is obtained based on the sweeping bandwidth, the window size of the window function, the FFT point quantity, the sweeping central frequency, the sampling rate, the sampling interval of the input data of the 2D FFT.

For example, the following expression can be used to obtain the velocity factor compensation coefficient:

vel_comp=$B \cdot \text{win2size}/2 \cdot n_{fft2} \cdot 1/T \cdot f_c \cdot F_s$.

In an embodiment, the compensated velocity factor P can be obtained by the velocity factor $P_{peak}$ obtained in CFAR subtracting the velocity compensation value $P_{peak-comp}$, that is, $P=P_{peak}-P_{peak-comp}$. Accordingly, the compensated range factor can be obtained in the following expression: $K=K_{peak}-K_{peak-comp}$.

In step 303, the object data is obtained based on the compensated peak data.

The object data includes at least one of range, velocity, angle, and shape.

For example, the following equation is used to obtain the object range:

$$R=(k \cdot F_s/n_{\text{fft1}} - P/T \cdot n_{\text{fft2}}) \cdot T \cdot c/2 \cdot B;$$

Similarly, the following equation can be used to obtain the object velocity:

$$v = p \cdot c/2 \cdot n_{\text{fft2}} \cdot T \cdot f_c$$

In the method for improving objection detection accuracy provided according to the present disclosure, after 2D FFT and CFAR and before DoA, the velocity factor and/or the range factor obtained from CFAR are compensated based on the velocity ambiguity factor to determine the object velocity and the object range, thereby effectively improving the accuracy of detecting the object velocity and the object range.

In an embodiment, whether the velocity ambiguity factor is greater than 0 is determined before determining the velocity compensation value and the range compensation value based on the velocity ambiguity factor, the remainder of Doppler shift, and the sampling interval of the input data in 2D FFT. In response to the velocity ambiguity factor being greater than 0, velocity ambiguity happens, and in response to the velocity ambiguity factor being equal to 0, there is no velocity ambiguity.

In an embodiment, in response to the velocity ambiguity factor being equal to 0, there is no velocity ambiguity. The object in this case is believed to be in low-velocity movement and no compensation is required. As such, the range compensation value and the velocity compensation value are both 0.

In an embodiment, in response to the velocity ambiguity factor being greater than 0, velocity ambiguity happens. The object in this case is believed to be in high-velocity movement and the object velocity needs to be compensated. As such, the velocity compensation value is obtained based on the velocity ambiguity factor, the remainder of Doppler shift and the sampling interval of the input data in 2D FFT.

In another embodiment, by setting a velocity threshold (i.e., velocity ambiguity threshold), whether the object velocity needs to be compensated or not is determined based on the currently obtained object velocity (or the velocity ambiguity factor). Specifically, in response to the currently obtained object velocity (or the velocity ambiguity factor) being greater than the preset velocity threshold for velocity (or the preset velocity ambiguity factor threshold), the object velocity needs to be compensated. Otherwise, the object velocity needs no compensation, the object data will be obtained by following the convention signal processing process.

In the embodiments of the present disclosure, whether to compensate the velocity factor and the range factor or not is determined based on the velocity ambiguity factor. Compensation, when unnecessary, can be omitted to improve the radar computing efficiency.

Figure 6:
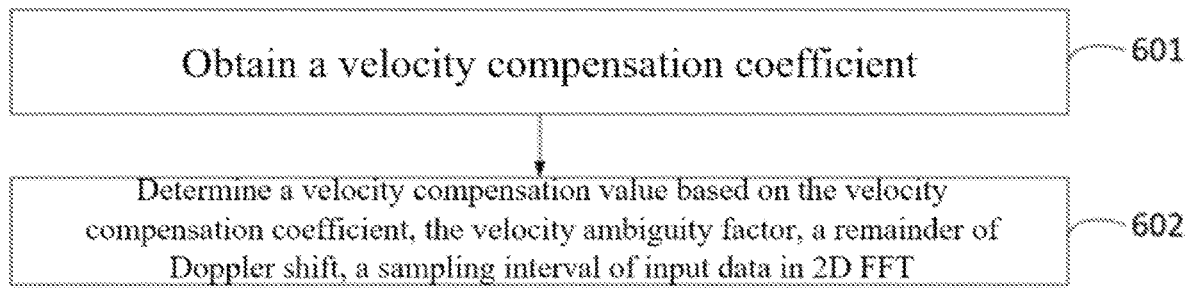
FIG. 6 is a flowchart of a method for calculating velocity compensation value provided according to an embodiment of the present disclosure.

In an embodiment, as shown in FIG. 6, in response to the velocity ambiguity factor being greater than 0, determining the velocity compensation value based on the velocity ambiguity factor, the remainder of Doppler shift and the sampling interval of input data in 2D FFT includes the following steps.

In step 601, the velocity compensation coefficient is obtained.

In an embodiment, the velocity compensation coefficient is a preset constant.

In another embodiment, obtaining the velocity compensation coefficient includes: obtaining 2D FFT point quantity, and determining the velocity compensation coefficient based on the 2D FFT point quantity, the sweeping central frequency, and the sampling rate.

In an embodiment of the present disclosure, the velocity compensation coefficient can be calculated by the following expression: $\text{vel\_comp} = B \cdot n_{\text{fft2}} \cdot 1/T \cdot f_c \cdot F_s$.

In the embodiments of the present disclosure, the 2D FFT point quantity $n_{\text{fft2}}$ can be understood as the number of rows with 1D FFT performed. The sampling rate $F_s$ is the sampling rate of digital sampling for mixed signals.

In another embodiment, before 2D FFT, windows along a range gate and a Doppler gate can be applied to sample data, respectively. The doppler gate window size can be set to win2size while the range gate window size can be set to win1size.

With the window applied, the following expression can be used to obtain the velocity compensation coefficient: $\text{vel\_comp} = B \cdot \text{win1size}/2 \cdot n_{\text{fft2}} \cdot 1/T \cdot f_c \cdot F_s$.

In this case, the velocity compensation coefficient will be calculated based on the range gate window size win1size, the sampling interval T of input data in 2D FFT, the 2D FFT point quantity $n_{\text{fft2}}$, sweeping central frequency $f_c$, and the sampling rate $F_s$.

In step 602, the velocity compensation value is determined based on the velocity compensation coefficient, the velocity ambiguity factor, the remainder of Doppler shift and the sampling interval of the input data in 2D FFT.

In an embodiment of the present disclosure, the following expression can be used to obtain the velocity compensation value: $P_{peak\_comp} \triangleq \text{vel\_comp} \cdot (q + f_{rd} \cdot T)$.

Specifically, the velocity compensation value can be calculated based on the velocity compensation coefficient vel_comp, the velocity ambiguity factor q, the remainder $f_{rd}$ of Doppler shift $f_D$, and the sampling interval T of the input data in 2D FFT.

In an embodiment of the present disclosure, the expression for the velocity compensation value is determined based on the expression for the mixed signal in time domain. And the expression for the mixed signal of the transmitting signal and echo signal in time domain is in the following: $x(t) = A \times \cos[2\pi((2BR/T_c + 2f_c v/c)ts + (2f_c v/c)nT + 2B_v/T_c \cdot nT \cdot t_s + 2f_c R/c)]$ By discretely digital sampling the mixed signal, the expression for the velocity compensation value can be determined.

In the embodiments of the present disclosure, the velocity compensation coefficient can be obtained based on the 2D FFT point quantity, the sweeping central frequency, and the sampling rate, by doing which the velocity compensation value can be more accurate. The more accurate the velocity compensation value, the more accurate the compensated velocity factor, and thus the more accuracy in object velocity detection based on the velocity factor.

Figure 7:
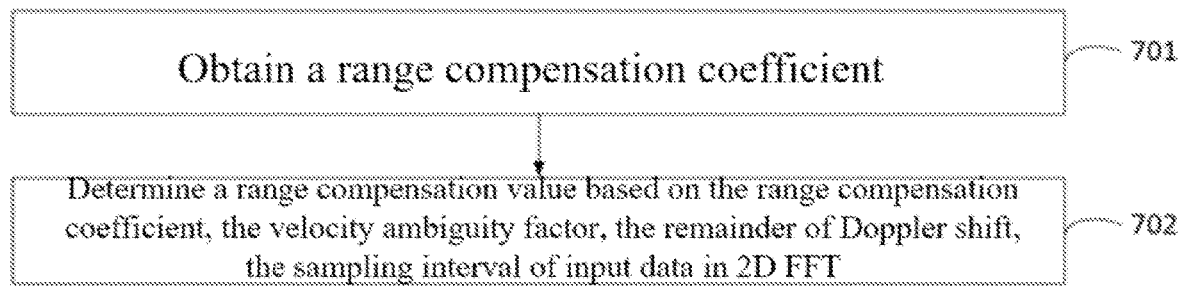
FIG. 7 is a flowchart of a method for calculating range compensation value provided according to an embodiment of the present disclosure.

In an embodiment, as shown in FIG. 7, in response to the velocity ambiguity factor being greater than 0, determining the range compensation value based on the velocity ambiguity factor, the remainder of Doppler shift and the sampling interval of the input data in 2D FFT includes following steps.

In step 701, the range compensation coefficient is obtained.

In an embodiment, the range compensation coefficient is a preset constant.

In another embodiment, obtaining the range compensation coefficient includes: obtaining 1D FFT point quantity, and determining the range compensation coefficient based on the 1D FFT point quantity, the sweeping central frequency, and the sampling rate.

In an embodiment of the present disclosure, the range compensation coefficient can be calculated by the following expression: $rng\_comp = B \cdot n_{fft1} \cdot 1/T \cdot f_c \cdot F_s$.

That is, the sampling interval T of the input data in 2D FFT, the 2D FFT point quantity $n_{fft1}$, the sweeping central frequency $f_c$ and the sampling rate $F_s$ are used to calculate the range compensation coefficient as above expression.

In another embodiment, before 2D FFT, windows along a range gate and a Doppler gate can be applied to sample data, respectively. The doppler gate window size can be set to win2size while the range gate window size can be set to win1size.

With the window applied, the following expression can be used to obtain the range compensation coefficient: $rng\_comp = B \cdot win2size/2 \cdot n_{fft1} \cdot 1/T \cdot f_c \cdot F_s$.

In this case, the range compensation coefficient will be calculated based on the velocity gate window size win2size, the sampling interval T of input data in 2D FFT, the 1D FFT point quantity $n_{fft1}$, sweeping central frequency $f_c$, and the sampling rate $F_s$.

In step 702, the range compensation value is determined based on the range compensation coefficient, the velocity ambiguity factor, the remainder of Doppler shift and the sampling interval of the input data in 2D FFT.

In an embodiment of the present disclosure, the following expression can be used to obtain the velocity compensation value: $K_{peak\_comp} \triangleq rng\_comp \cdot (q + f_{rd} \cdot T)$.

That is, the range compensation value can be calculated based on the velocity compensation coefficient rng_comp, the velocity ambiguity factor q, the remainder $f_{rd}$ of Doppler shift $f_D$, and the sampling interval T of the input data in 2D FFT.

In the embodiments of the present disclosure, the range compensation coefficient can be obtained based on the 1D FFT point quantity, the sweeping central frequency, and the sampling rate, by doing which the range compensation value can be more accurate. The more accurate the range compensation value, the more accurate the compensated range factor, and thus the more accuracy in object range detection based on the velocity factor.

Figure 8:
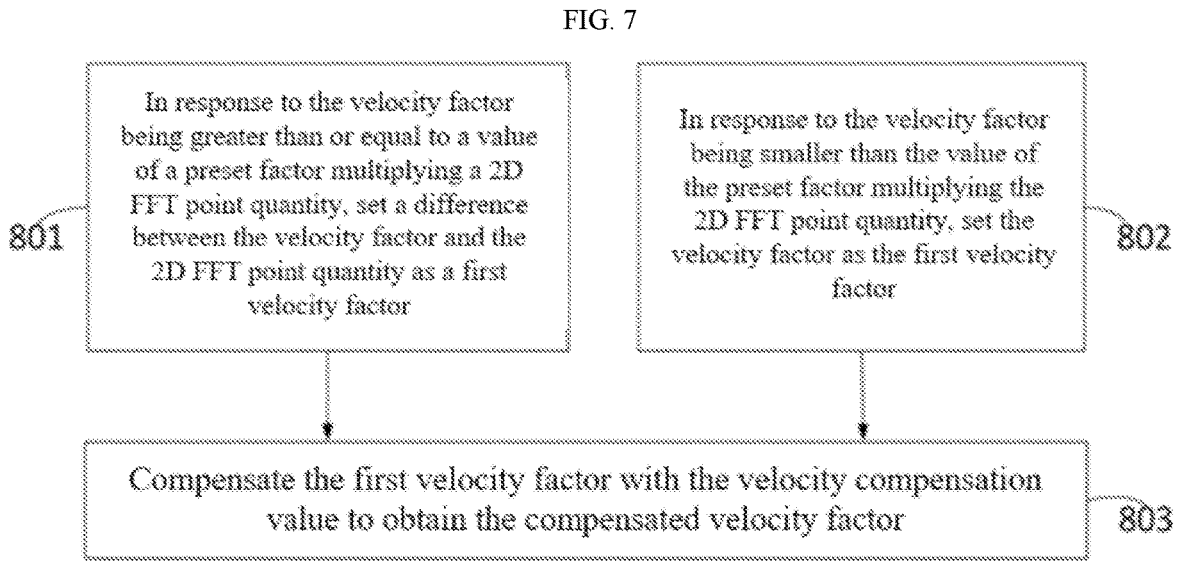
FIG. 8 is a flowchart of another method for obtaining the compensated velocity factor provided according to an embodiment of the present disclosure.

In an embodiment of the present disclosure, 2D FFT includes Doppler FFT. As shown in FIG. 8, compensating the velocity factor with the velocity compensation value to obtain the compensated velocity factor includes the following steps.

In step 801, in response to the velocity factor being greater than or equal to no smaller the value of a preset factor multiplying 2D FFT point quantity, a difference between the velocity factor and 2D FFT point quantity is defined as a first velocity.

In an embodiment, the preset factor ranges from 0 to 1.

In an embodiment, the preset factor is 0.5.

In the embodiments of the present disclosure, the first velocity factor can be denoted by $P_{peak}'$ and in response to $P_{peak}$ being greater than or equal to $n_{fft2}$, $P_{peak}' = P_{peak} - n_{fft2}$.

In step 802, in response to the velocity factor being smaller than the value of a preset factor multiplying 2D FFT point quantity, the velocity factor is set as the first velocity factor.

In response to $P_{peak}$ being smaller than $n_{fft2}$, $P_{peak}' = P_{peak}$.

In step 803, the first velocity factor is compensated with the velocity compensation value to obtain the compensated velocity factor.

In an embodiment, compensating the first velocity factor with the velocity compensation value includes: the first velocity factor subtracts the velocity compensation value to obtain the compensated velocity factor $P = P_{peak}' - P_{peak\_comp}$.

In the embodiments of the present disclosure, the first velocity factor is determined by different determining conditions, so that, the compensated velocity factor can better reflect the real velocity information of the object, which means the more accurate the compensated velocity factor, the more accuracy in object velocity detection.

Figure 9:
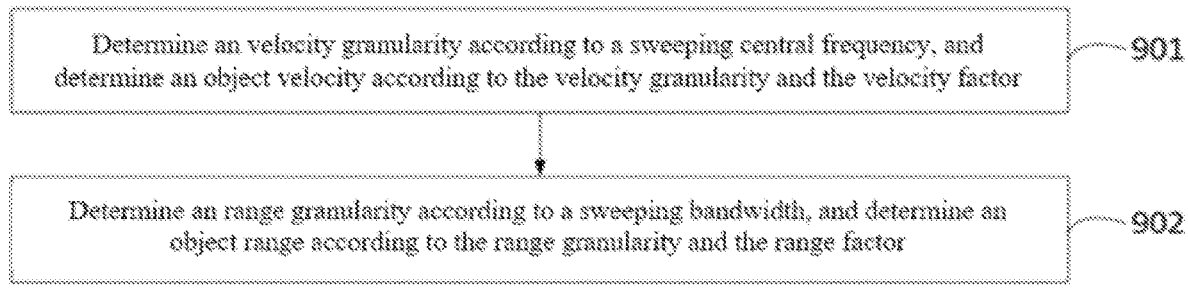
FIG. 9 is a flowchart of another method for improving object detection accuracy provided according to an embodiment of the present disclosure.

In an embodiment, in response to the velocity ambiguity factor being equal to 0, the velocity compensation value and the range compensation value are both 0. In this case, determining the object velocity and the object range based on the compensated velocity factor and the compensated range factor is shown in FIG. 9, and includes the following steps.

In step 901, velocity granularity is determined according to the sweeping central frequency, and the object velocity is determined based on the velocity granularity and the velocity factor.

Determining the velocity granularity based on the sweeping central frequency includes: obtain the sweeping central frequency $f_c$ and the sampling interval T of the input data in 2D FFT to calculate the velocity granularity as expressed: $\Delta v = c/2f_c \cdot 1/nT$, where $f_c$ is the sweeping central frequency, T is the sampling interval of the input data in 2D FFT, n is the chirp number.

In an embodiment, the object velocity is determined based on the velocity granularity and velocity factor as expressed: $V = \Delta v \cdot P_{peak}$.

In step 902, range granularity is determined according to the sweeping bandwidth B, and the object range is determined according to the range granularity and the range factor.

The range granularity is determined based on the sweeping bandwidth B corresponding to the echo signal as expressed: $\Delta = c/2B$.

The object range is determined based on the range granularity and range factor as expressed: $R = K_{peak} \cdot \Delta R$.

In the embodiments of the present disclosure, in response to the velocity ambiguity factor being equal to 0, simple calculation based on the velocity granularity and the range granularity can determine the object range and the object velocity. In this case, efficiency of operation and reaction of the radar is improved.

Figure 10:
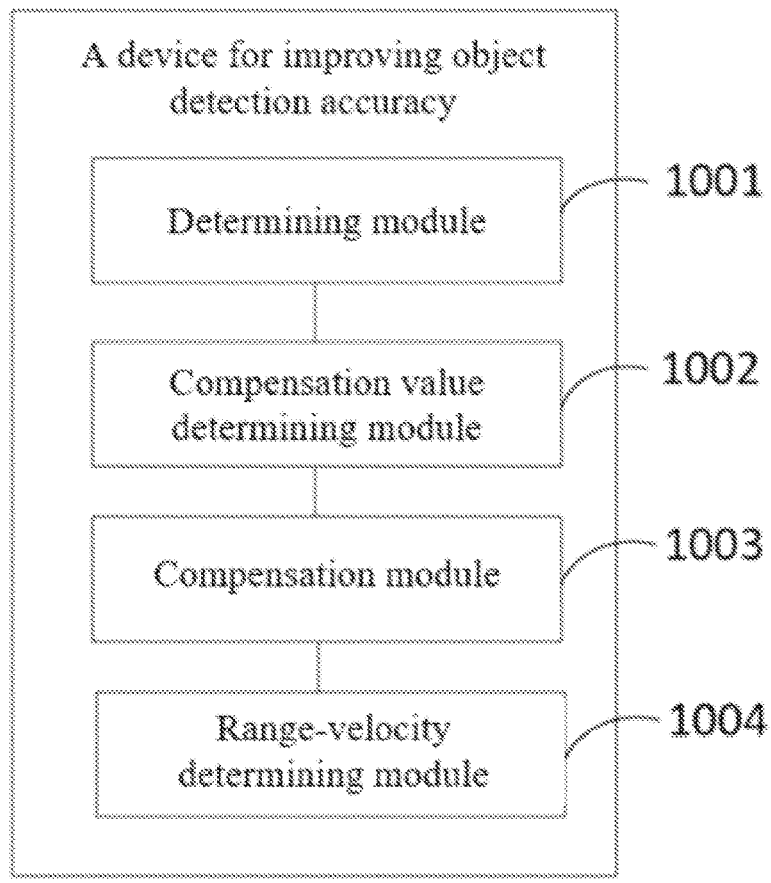
FIG. 10 is a block diagram of a device for improving object detection accuracy provided according to an embodiment of the present disclosure.

Reference is made FIG. 10, which is a block diagram of a device for improving object detection accuracy provided according to an embodiment of the present disclosure. The device for improving object detection accuracy can be applied in a set-up as shown in FIG. 1. As shown in FIG. 10, the device for improving object detection accuracy includes a determining module 1001, a compensation value determining module 1002, a compensation module 1003 and a range-velocity determining module 1004.

The determining module 1001 is configured to perform 2D FFT and CFAR detection based on the echo signal, to obtain the object peak data, the velocity ambiguity factor, the remainder of Doppler shift and the sampling interval of the input data in 2D FFT of the object. The object peak data include the velocity factor and the range factor.

The compensation value determining module 1002 is configured to determine the velocity compensation value and/or the range compensation value, respectively, based on the velocity ambiguity factor, the remainder of Doppler shift and the sampling interval of the input data in 2D FFT.

The compensation module 1003 is configured to compensate the velocity factor with the velocity compensation value to obtain the compensated velocity factor, and to compensate the range factor with the range compensation value to obtain the compensated range factor.

The range-velocity determining module 1004 is configured to determine the object velocity and the object range based on the compensated range factor and the compensated velocity factor.

In an of the present disclosure, the compensation value determining module 1002 is further configured to, in response to the velocity ambiguity factor being greater than 0, determine the velocity compensation value based on the velocity ambiguity factor, the remainder of Doppler shift and the sampling interval of the input data in 2D FFT, and to determine the range compensation value based on the velocity ambiguity factor, the remainder of Doppler shift, the sampling interval of the input data in 2D FFT.

In an of the present disclosure, the compensation value determining module 1002 is further configured to obtain the velocity compensation coefficient, and determine the velocity compensation value based on the velocity compensation coefficient, the velocity ambiguity factor, the remainder of Doppler shift and the sampling interval of the input data in 2D FFT.

In an embodiment of the present disclosure, the compensation value determining module 1002 is further configured to determine the velocity compensation coefficient based on the 2D FFT point quantity, the sweeping central frequency, and the sampling rate.

In an embodiment of the present disclosure, the compensation value determining module 1002 is further configured to obtain the range compensation coefficient, and determine the range compensation value based on the range compensation coefficient, the velocity ambiguity factor, the remainder of Doppler shift, and the sampling interval of the input data in 2D FFT.

In an embodiment of the present disclosure, the compensation value determining module 1002 is further configured to determine the range compensation coefficient based on the 2D FFT point quantity, the sweeping central frequency, and the sampling rate.

In an embodiment of the present disclosure, the compensation value determining module 1002 is further configured to, in response to the velocity ambiguity factor being equal to 0, determine the range compensation value and the velocity compensation value as 0.

Accordingly, the range-velocity determining module 1004 is further configured to determine the velocity granularity based on the sweeping central frequency, and to determine the object velocity based on the velocity granularity and the velocity factor. The range-velocity determining module 1004 is further configured to determine the range granularity based on the sweeping bandwidth corresponding to the echo signal, and to determine the object range based on the range granularity and the range factor.

In an embodiment of the present disclosure, the compensation module 1003 is further configured to, in response to the velocity factor being no smaller than the value of a preset factor multiplying 2D FFT point quantity, set a difference between the velocity factor and the 2D FFT point quantity as the first velocity factor, and in response to the velocity factor being smaller than the value of the preset factor multiplying 2D FFT point quantity, set the velocity factor as the first velocity factor, and Compensate the first velocity factor with the velocity compensation value to obtain the compensated velocity factor.

In an embodiment of the present disclosure, the compensation module 1003 is further configured to subtract the velocity compensation value from the first velocity factor to obtain the compensated velocity factor.

In an embodiment of the present disclosure, the compensation module 1003 is further configured to subtract the range compensation value from the range factor to obtain the compensated range factor.

The specific conditions for the device for improving object detection accuracy may refer to the above conditions for the method for improving object detection accuracy and will not be repeated. Each module in the device for improving object detection accuracy can be realized, completely or partly through hardware, software, and the combination of the two. The modules can be embedded in or dependent of the processor of the radar system as hardware, or stored in the memory of the radar system as software, so that the processor can enable module-specific executions.

In an embodiment, a computer device is provided, including a memory and a processor, where the memory stores one or more programs that, when executed by the processor, cause the processor to implement the method according to any one above.

In an embodiment, a computer-readable medium is provided, where the computer-readable storage medium stores one or more programs that, when executed by a processor, cause the processor to implement the method according to any one above.

Those of ordinary skill in the art can understand the whole or part of the process of the above method can be realized with relevant hardware commanded by one or more programs. The one or more programs can be stored in the non-volatile computer-readable storage medium, when executed by a processor, cause the processor to implement the method according to any one above embodiments. The memory, storage media, database, or other media in the embodiments of the present disclosure include a non-volatile memory and/or a volatile memory. The non-volatile memory includes read only memory (ROM), programmable ROM (PROM), electrically programmable ROM (EPROM), electrically erasable programmable ROM (EEPROM), and flash. The volatile memory includes random access memory (RAM), and external cache. For description rather than limitation, RAM has many types, including static RAM (SRAM), dynamic RAM (DRAM), synchronous DRAM (SDRAM), double data rate SDRAM (DDRSDRAM), enhanced SDRAM (ESDRAM), synchlink DRAM (SLDRAM), Rambus direct RAM (RDRAM), direct Rambus DRAM (DRDRAM), and Rambus DRAM (RDRAM).

The features set forth in the embodiments can be randomly combined and for brief description, not all possible combinations of such features are elaborated. However, as long as two or more features are not exclusive to each other, they can be combined, which shall be construed to be within the scope of the present disclosure.

The above embodiments are only part of the embodiments of the present disclosure, and their descriptions are specific and detailed, but they should not be understood as a limitation of the scope of the present disclosure for this reason. It should be noted that for a person of ordinary skill in the art, several variations and improvements may be made without departing from the concept of the present disclosure, and the several variations and improvements shall fall within the scope of protection of the present disclosure. Therefore, the scope of protection of the present disclosure shall be subject to the appended claims.

What is claimed is:

1. A method for improving object detection accuracy, comprising:
   transmitting, by a transmitting antenna, radio signals to a target area;
   receiving, by a receiving antenna, echo signals from one or more objects in the target area reflecting the radio signals;
   mixing, by a mixer, the radio signals and the echo signals to obtain difference frequency signals;
   performing analog-to-digital conversion (ADC), sampling, range fast Fourier transform (1D FFT), doppler fast Fourier transform (2D FFT), and constant false alarm rate (CFAR) detection on the difference frequency signals to obtain a velocity ambiguity factor q, a remainder $f_{rd}$ of a doppler frequency shift $f_D$, a sampling interval of an input data of the 2D FFT, and object peak data, wherein $f_D=f_{rd}+q\times F$ and F represents a pulse repetition frequency;
   obtaining a compensation value based on a compensation coefficient, the velocity ambiguity factor, the remainder of the doppler frequency shift, and the sampling interval of the input data of the 2D FFT, wherein the compensation coefficient is a preset constant or is obtained based on the sampling interval of the input data of the 2D FFT, and;
   compensating the object peak data based on the compensation value; and
   obtaining object data based on the compensated object peak data.

2. The method according to claim 1, further comprising:
   presetting a velocity threshold;
   obtaining an object velocity; and
   determining whether the object velocity is greater than the preset velocity threshold;
   in response to the object velocity being greater than the preset velocity threshold, compensating the object peak data based on the velocity ambiguity factor and obtaining the object data based on the compensated object peak data.

3. The method according to claim 1, wherein the object data comprises at least one of range, velocity, angle, and shape.

4. The method according to claim 1, wherein obtaining the compensation coefficient based on the sampling interval of the input data of the 2D FFT comprises:
   obtaining the compensation coefficient based on a sweeping bandwidth, a window size of a window function, FFT point quantity, a sweeping central frequency, a sampling rate, and the sampling interval of the input data of the 2D FFT.

5. The method according to claim 4, wherein in obtaining an object range based on the compensated object peak data, the compensated object peak data comprises a range factor, a compensation value comprises a range compensation value, the compensation coefficient comprises a range compensation coefficient, the window size of the window function comprises a doppler window size, the FFT point quantity comprises point quantity of a window function in the 1D FFT, and obtaining the compensation coefficient based on the sweeping bandwidth, the window size of the window function, the FFT point quantity, the sweeping central frequency, the sampling rate, the sampling interval of the input data of the 2D FFT comprise:
   obtaining the range compensation coefficient based on the sweeping bandwidth, the window size of the window function, the FFT point quantity, the sweeping central frequency, the sampling rate, the sampling interval of the input data of the 2D FFT;
   wherein the range compensation value is obtained based on the range compensation coefficient and the velocity ambiguity factor, and the range factor of the object peak data is compensated based on the range compensation value, to obtain the object range.

6. The method according to claim 4, wherein in obtaining an object velocity based on the compensated object peak data, the compensated object peak data comprises a velocity factor, a compensation value comprises a velocity compensation value, the compensation coefficient comprises a velocity compensation coefficient, the window size of the window function comprises a range window size, the FFT point quantity comprises point quantity of a window function in the 2D FFT, and obtaining the compensation coefficient based on the sweeping bandwidth, the window size of the window function, the FFT point quantity, the sweeping central frequency, the sampling rate, the sampling interval of the input data of the 2D FFT comprise:
   obtaining the velocity compensation coefficient based on the sweeping bandwidth, the window size of the window function, the FFT point quantity, the sweeping central frequency, the sampling rate, the sampling interval of the input data of the 2D FFT;
   wherein the velocity compensation value is obtained based on the velocity compensation coefficient and the velocity ambiguity factor, and the velocity factor of the object peak data is compensated based on the velocity compensation value, to obtain the object velocity.

7. An integrated circuit, comprising:
   a signal transmitting and receiving channel, configured to transmit radio signals and receive echo signals reflected by an object;
   a signal processing module, configured to obtain object data based on the method according to claim 1.

8. The integrated circuit according to claim 7, wherein the signal processing module comprises:
   a signal processing unit, configured to obtain a velocity ambiguity factor and object peak data based on the echo signals;
   a compensation unit, configured to compensate the object peak data based on the velocity ambiguity factor; and
   a data processing unit, configured to obtain object data based on the compensated object peak data.

9. The integrated circuit according to claim 8, wherein the radio signals are millimeter wave signals.

10. The integrated circuit according to claim 7, wherein the integrated circuit is an antenna-in-package (AiP) chip or an antenna-on-chip (AoC) chip.

11. A radio device, comprising:
    a carrier;
    an integrated circuit, wherein the integrated circuit is the integrated circuit according to claim 7, and is mounted on the carrier; and
    an antenna, wherein the antenna is mounted on the carrier or form an AiP or an AoC structure together with the integrated circuit, and is configured to transmit and receive radio signals.

12. The integrated circuit according to claim 7, wherein the integrated circuit is connected to a digital module of an on-chip system by a unified digital controller, and is configured to uniformly manage and configure operation state of the digital module by a configuration module and a state machine.

13. The integrated circuit according to claim 7, further comprising a plurality of digital circuits, a plurality of function-specific digital modules, and an operation control device, wherein the plurality of function-specific digital modules are configured to detect whether the plurality of digital circuits have proper functioning, and the operation control device is configured to uniformly configure and manage the plurality of function-specific digital modules.

14. The radio device according to claim 11, wherein the carrier is a printed circuit board (PCB).

* * * * *